United States Patent
Shin et al.

(10) Patent No.: US 11,620,360 B2
(45) Date of Patent: Apr. 4, 2023

(54) METHODS AND SYSTEMS FOR RECOGNIZING OBJECT USING MACHINE LEARNING MODEL

(71) Applicant: RESEARCH & BUSINESS FOUNDATION SUNGKYUNKWAN UNIVERSITY, Suwon-si (KR)

(72) Inventors: Dong Kun Shin, Seoul (KR); Geun Hye Jo, Suwon-si (KR)

(73) Assignee: Research & Business Foundation Sungkyunkwan University, Suwon-si (KR)

(*) Notice: Subject to any disclaimer, the term of this patent is extended or adjusted under 35 U.S.C. 154(b) by 155 days.

(21) Appl. No.: 17/197,461

(22) Filed: Mar. 10, 2021

(65) Prior Publication Data

US 2021/0287051 A1 Sep. 16, 2021

(30) Foreign Application Priority Data

Mar. 11, 2020 (KR) .................. 10-2020-0030400

(51) Int. Cl.
| | |
|---|---|
| G06F 17/00 | (2019.01) |
| G06F 18/21 | (2023.01) |
| G06T 7/246 | (2017.01) |
| G06F 18/23 | (2023.01) |
| G06F 18/214 | (2023.01) |

(52) U.S. Cl.
CPC .......... *G06F 18/217* (2023.01); *G06F 18/214* (2023.01); *G06F 18/23* (2023.01); *G06T 7/246* (2017.01); *G06T 2207/20081* (2013.01)

(58) Field of Classification Search
CPC .. G06V 30/413; G06V 10/235; G06V 10/762; G06V 10/987; G06V 30/40; G06V 10/95; G06K 9/6218; G06K 9/6228; G06K 9/6256; G06K 9/6268; G06N 20/00
See application file for complete search history.

(56) References Cited

U.S. PATENT DOCUMENTS

2019/0087668 A1* 3/2019 Kim ................ G06K 9/6274
2020/0193246 A1* 6/2020 Jian ................ G06V 10/945

FOREIGN PATENT DOCUMENTS

| JP | 2004-101301 | * | 4/2004 |
| KR | 10-2019-0114241 A | | 10/2019 |
| WO | WO 2019/124634 | * | 6/2019 |

OTHER PUBLICATIONS

Machine translation for WO 2019/124634 (Year: 2019).*
Machine translation for JP 2004-101301 (Year: 2004).*

* cited by examiner

*Primary Examiner* — Qian Yang
(74) *Attorney, Agent, or Firm* — NSIP Law (57) ABSTRACT

In accordance with an aspect of the present disclosure, there is provided an object recognizing method using a machine learning model performed by an object recognizing apparatus including, obtaining an image for recognizing an object, predicting an object appearance area on the obtained image by using a machine learning model that is trained to learn a feature of an area on which the object appears in advance and recognizing the object on the obtained image by using the predicted object appearance area.

20 Claims, 7 Drawing Sheets

METHODS AND SYSTEMS FOR RECOGNIZING OBJECT USING MACHINE LEARNING MODEL

CROSS REFERENCE TO RELATED APPLICATIONS

This application claims the benefit under 35 USC § 119(a) of Korean Patent Application No. 10-2020-0030400 filed on Mar. 11, 2020 in the Korean Intellectual Property Office, the entire disclosure of which is incorporated herein by reference for all purposes.

TECHNICAL FIELD

The present disclosure relates to an object recognition method and an object recognition system using a machine learning model.

BACKGROUND

Object recognition on the video is used for various purposes. The object recognition on the video is used for autonomous driving, driving assistance, or CCTV image analysis. An image captured by a vehicle is used for the autonomous driving or the driving assistance by recognizing an object ahead or a surrounding object. After recognizing an object and a person on the image included in the video recorded by the CCTV, statistical information is generated, or an event is detected by analyzing them.

As a method of object recognition, a deep neural network that is easy to learn and has high accuracy is mainly used in recent years. Since the deep neural network with high inference accuracy has a large amount of computation, it takes a long time for computation in a device having low computational capability. It is necessary to reduce the amount of computation in order to quickly perform object recognition in a system on chip (SoC) mounted on a vehicle, a drone, or a closed-circuit television (CCTV). As described above, object recognition has a problem that the latency is prolonged when it is performed in the SoC mounted on the vehicle, drone, or CCTV due to a large amount of computation, and therefore, it is necessary to reduce the amount of computation.

Since the amount of computation for object recognition is proportional to the size of the image to be recognized, methods of limiting an image area on which the object recognition is performed have been proposed in order to reduce the amount of computation. These conventional methods establish fixed regions of interest for recognizing pedestrians, vehicle license plates of a vehicle ahead, signs ahead, lanes, and the like. Herein, the conventional methods reduce the recognition area by determining the area around the detected target object as dynamic regions of interest.

Such conventional methods designed an algorithm that reduces the area to be recognized by a person with prior knowledge about specific photographing situations. Therefore, there is a limitation that the conventional methods cannot be applied to images in other situations.

SUMMARY

Embodiments of the present disclosure are to provide an object recognizing method and an object recognizing system using a machine learning model in order to quickly perform object recognition by inferring an area on which an object will newly appear on an arbitrary image by using the machine learning model.

However, the problem to be solved by the present disclosure is not limited thereto, and may be variously expanded in an environment within a range not departing from the idea and the scope of the present disclosure.

The disclosed technology may have the following effects. However, since it does not mean that a specific embodiment should include all of the following effects or only the following effects, it should not be understood that the scope of the rights of the disclosed technology is limited thereby.

Embodiments of the present disclosure may quickly perform object recognition by inferring an area on which an object will newly appear on an arbitrary image by using the machine learning model.

Embodiments of the present disclosure may quickly perform object recognition by defining a candidate area on which an object will newly appear on an arbitrary image, performing the object recognition on the defined candidate area, and integrating a result of the performed object recognition with a previous result of the object recognition.

Embodiments of the present disclosure may provide a result of object recognition more quickly by performing a dataset generating operation and a machine learning operation that may use a large amount of computation and storage space by a separate object recognizing server.

In accordance with an aspect of the present disclosure, there is provided an object recognizing method using a machine learning model performed by an object recognizing apparatus including, obtaining an image for recognizing an object, predicting an object appearance area on the obtained image by using a machine learning model that is trained to learn a feature of an area on which the object appears in advance and recognizing the object on the obtained image by using the predicted object appearance area.

In accordance with an aspect of the present disclosure, there is provided an object recognizing apparatus using a machine learning model, the apparatus including, a memory configured to store the machine learning model that is trained to learn one or more programs and a feature of an area on which an object appears in advance and a processor configured to execute the one or more stored programs, and wherein the processor is configured to obtain an image for recognizing the object, predicting an object appearance area on the obtained image by using the machine learning model that is trained in advance and recognizing the object on the obtained image by using the predicted object appearance area.

DETAILED DESCRIPTION

Figure 1:
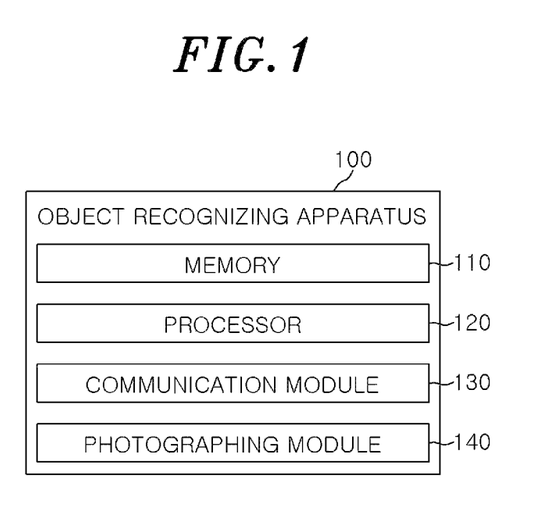
FIG. 1 shows a block diagram illustrating a configuration of an object recognizing apparatus using a machine learning model according to an embodiment of the present disclosure.

FIG. 1 shows a block diagram illustrating a configuration of an object recognizing apparatus 100 using a machine learning model according to an embodiment of the present disclosure.

As shown in FIG. 1, the object recognizing apparatus 100 using the machine learning model according to an embodiment of the present disclosure includes a memory 110 and a processor 120. Herein, the object recognizing apparatus 100 using the machine learning model may further include a communication module 130 and a photographing module 140. However, the illustrated components of the object recognizing apparatus 100 are not limited thereto. For example, the object recognizing apparatus 100 may be implemented by more components than the illustrated components, or may be implemented by fewer components than the illustrated components.

Hereinafter, a detailed configuration and operation of each component of the object recognizing apparatus 100 using the machine learning model of FIG. 1 will be described.

The photographing module 140 photographs an arbitrary image or an image on which object recognition is performed, and transmits the photographed image to the processor 120.

The communication module 130 receives, from outside, a photographed arbitrary image or an image on which object recognition is performed, and transmits it to the processor 120.

The memory 110 stores a machine learning model that is trained to learn one or more programs and a feature of an area on which an object appears in advance.

The processor 120 executes one or more programs stored in the memory 110. The processor 120 obtains an image for recognizing an object, predicts an object appearance area on the image by using the pre-trained machine learning model, and recognizes the object on the image by using the predicted object appearance area.

According to embodiments, for each frame of the image including a plurality of frames, the processor 120 may generate an object appearance area dataset in which a first area on which an object newly appears and a second area on which an object does not newly appear are distinguished.

According to embodiments, the processor 120 may generate identification information and position information of an object by performing object recognition for each frame of an image, and then performing object tracking for each frame by using object recognition information, and may generate an object appearance area dataset that stores a label distinguishing an area on which an object newly appears and an area on which an object does not newly appear by using the generated identification information and the generated position information of the object for each frame.

According to embodiments, the processor 120 may extracts a common feature of an area on which an object appears by using the generated object appearing area dataset, and may train the machine learning model to learn the extracted common feature of the area on which the object appears.

According to embodiments, the processor 120 may infer a candidate area on which a new object will appear, and may train the machine learning model to learn a common feature of the inferred candidate area.

According to embodiments, the processor 120 may cluster a plurality of pixels of an image as a Superpixel in the generated object appearance area dataset, and may train the machine learning model to predict a new object appearance area by Superpixel Image Segmentation that is a unit of the clustered Superpixel.

According to embodiments, the processor 120 may recognize an object on an entire area for a first frame included in the image, and perform object recognition by defining, from a second frame, an area on which object recognition is performed as the predicted object appearance area.

According to embodiments, the processor 120 may update the object appearance area by using a cumulative movement value between a current frame and a previous frame on which the object appearance area was predicted on the image.

According to embodiments, the processor 120 may update the object appearance area by using the cumulative movement value if the cumulative movement value is smaller than or equal to a predetermined threshold value, and may re-predict an object appearance area on the image if the cumulative movement value is greater than the predetermined threshold value.

According to embodiments, the processor 120 may calculate a cumulative motion vector by accumulating an average of a motion vector for an area on which an object is not recognized on the previous frame, and may calculate a cumulative movement value between the previous frame and the current frame by using the calculated cumulative motion vector.

Figure 2:
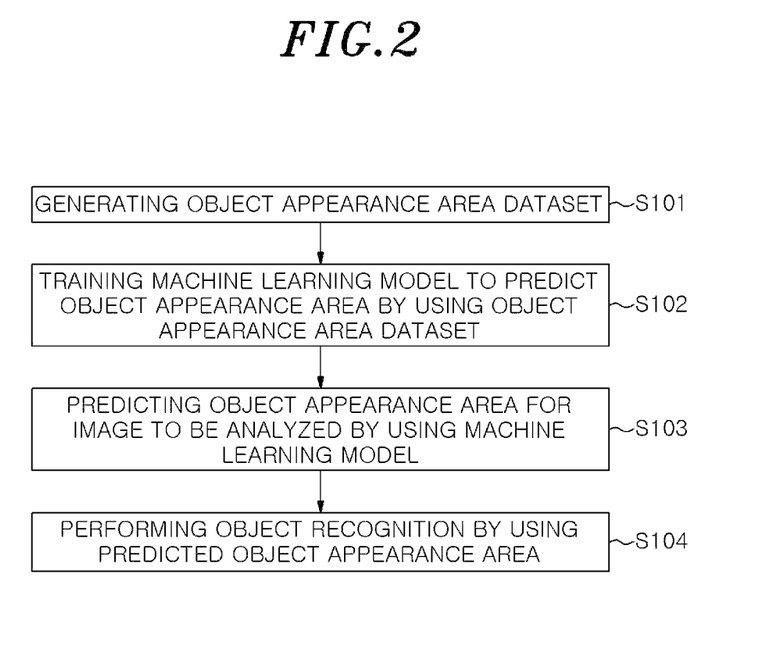
FIG. 2 shows a flowchart illustrating an object recognizing method using a machine learning model according to an embodiment of the present disclosure.

FIG. 2 shows a flowchart illustrating an object recognizing method using a machine learning model according to an embodiment of the present disclosure.

In a step S101, the object recognizing apparatus 100 generates an object appearance area dataset.

In a step S102, the object recognizing apparatus 100 trains the machine learning model to predict an object appearance area by using the object appearance area dataset.

In a step S103, the object recognizing apparatus 100 predicts the object appearance area for an image to be analyzed by using the machine learning model.

In a step S104, the object recognizing apparatus 100 performs object recognition by using the predicted object appearance area. In other words, the object recognizing apparatus 100 may infer the object appearance area on a video to be analyzed by using the trained machine learning model, and may perform object recognition by using a result thereof. As described above, an embodiment of the present disclosure performs object recognition by using the machine learning model that infers an area on which an object will newly appear for an arbitrary image. When attempting to repeatedly perform the object recognition for a video by using the machine learning model, an embodiment of the present disclosure may reduce an area on which the object recognition is performed, and may integrating it with a result of a previous object recognition, thereby obtaining object information with a small amount of computation.

Figure 3:
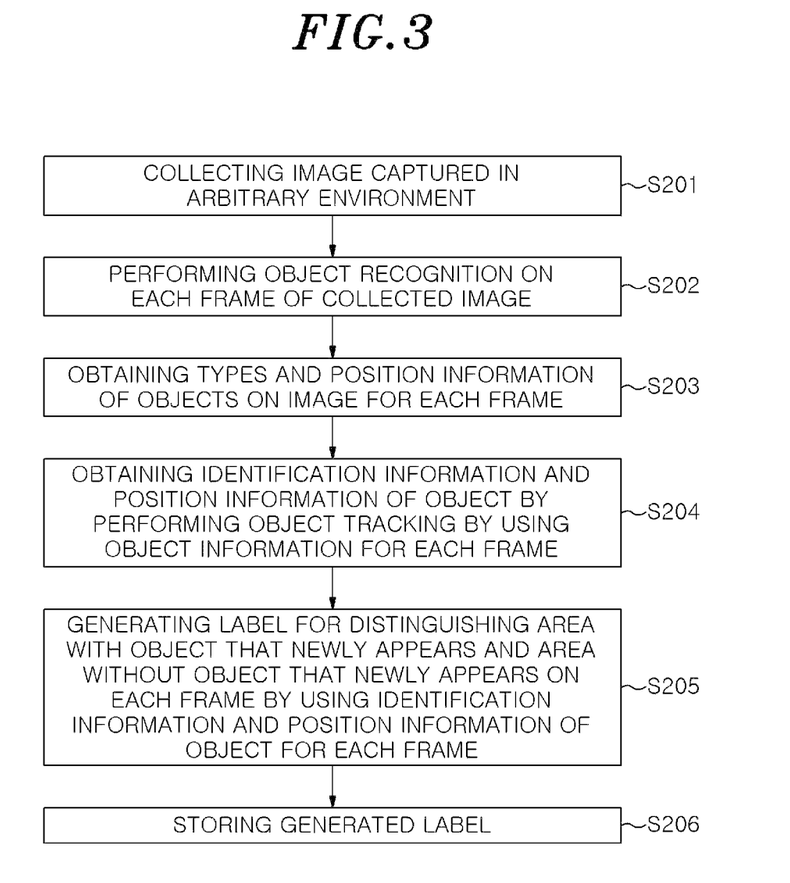
FIG. 3 shows a flowchart illustrating a process of generating a dataset in an object recognizing method using a machine learning model according to an embodiment of the present disclosure.

FIG. 3 shows a flowchart illustrating a process of generating a dataset in an object recognizing method using a machine learning model according to an embodiment of the present disclosure.

An embodiment of the present disclosure includes a machine learning model that receives a video image or an image as an input and predicts an area on which an object appears. In addition, in order to train the machine learning model, a dataset for prediction of an object appearance area is generated. Hereinafter, a process of generating the dataset will be described.

In a step S201, the object recognizing apparatus 100 collects an image captured in an arbitrary environment.

In a step S202, the object recognizing apparatus 100 performs object recognition on each frame of the collected image.

In a step S203, the object recognizing apparatus 100 obtains types and position information of objects on the image for each frame. The object recognizing apparatus 100 performs object recognition on each frame of the image, thereby obtaining the types and the position information of the objects existing on the image for each frame.

In a step S204, the object recognizing apparatus 100 obtains identification information and position information of an object by performing object tracking by using object information for each frame.

In a step S205, the object recognizing apparatus 100 generates, for each frame, a label for distinguishing an area with an object that newly appears and an area without an object that newly appears on each frame by using the identification information and position information of the object. For example, the object recognizing apparatus 100 may generate a label for an area on which a specific object newly appears for each frame.

In a step S206, the object recognizing apparatus 100 stores the generated label.

Figure 4:
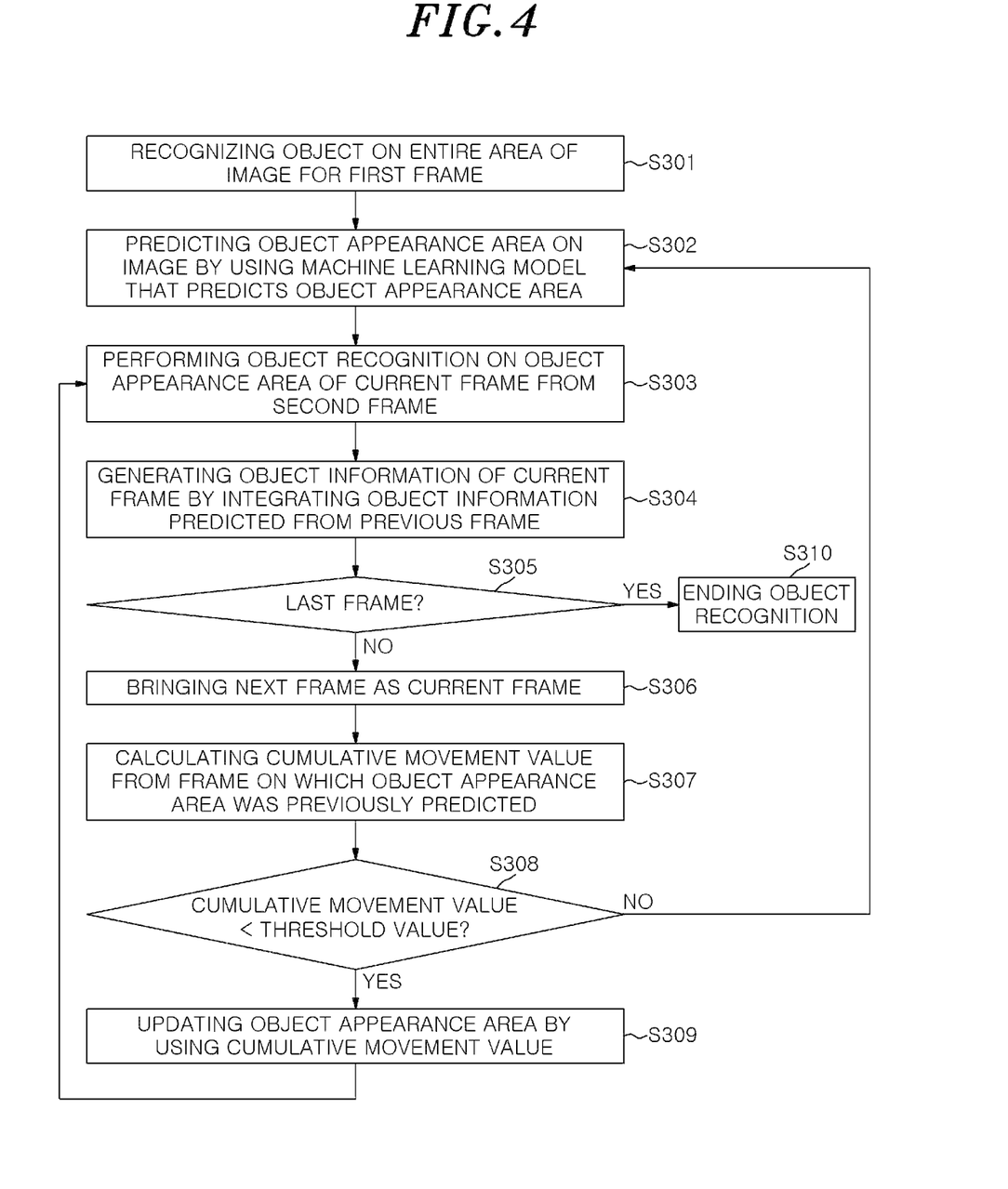
FIG. 4 shows a flowchart illustrating a method of using object recognition on an image in an object recognizing method using a machine learning model according to an embodiment of the present disclosure.

FIG. 4 shows a flowchart illustrating a method of using object recognition on an image in an object recognizing method using a machine learning model according to an embodiment of the present disclosure.

In a step S301, the object recognizing apparatus 100 recognizes an object on an entire area of an image for a first frame. In other words, the object recognizing apparatus 100 recognizes the object on an entire image for the first frame on which the object recognition operation starts.

In a step S302, the object recognizing apparatus 100 predicts an object appearance area on the image by using a machine learning model that predicts an object appearance area.

In a step S303, from a second frame, the object recognizing apparatus 100 performs object recognition on the object appearance area of a current frame. In other words, from the second frame, the object recognizing apparatus 100 defines an area on which object recognition is performed by using the predicted object appearance area and performs the object recognition.

In a step S304, the object recognizing apparatus 100 generates object recognition information of a current frame by integrating the object recognition information predicted from a previous frame.

In a step S305, the object recognizing apparatus 100 identifies whether the current frame is the last frame of the image.

If the current frame is not the last frame of the image, in a step S306, the object recognizing apparatus 100 brings a next frame as a current frame.

In a step S307, the object recognizing apparatus 100 calculates a cumulative movement value from a frame on which the object appearance area was previously predicted. Herein, the cumulative movement value is obtained by obtaining and accumulating values related to a movement of object on an image such as a motion vector from the image.

In a step S308, the object recognizing apparatus 100 identifies whether the cumulative movement value is smaller than a threshold value. for example, the object recognizing apparatus 100 performs the step S302 again if object recognition is performed for an image captured by a fixed camera, that is, a fixed field of view on which an image is not moved.

If the cumulative movement value is smaller than the threshold value, in a step S309, the object recognizing apparatus 100 updates the object appearance area by using the cumulative movement value. If the cumulative movement value does not exceed the threshold value, the object recognizing apparatus 100 updates a result of predicting the object appearance area by using the cumulative movement value, and then performs the step S303 again.

On the other hand, if the cumulative movement value is equal to or greater than the threshold value, the object recognizing apparatus 100 performs the step S302 of predicting the object appearance area on the image again by using the machine learning model. Thereafter, the object recognizing apparatus 100 performs the steps again from the step S303 by using the newly predicted object appearance area. As described above, if the cumulative movement value exceeds the threshold value, the object recognizing apparatus 100 performs the step S302 of predicting the object appearance area again based on a current frame, and performs the following steps.

On the other hand, in a step S310, the object recognizing apparatus 100 ends the object recognition operation if the current frame is the last frame of the image.

On the other hand, a process of obtaining the cumulative movement value used in an embodiment of the present disclosure will be described. The object recognizing apparatus 100 obtains a motion vector between a current frame and an immediately preceding frame. A unit for obtaining the motion vector is a block obtained by dividing an entire image into several rectangles. The object recognizing apparatus 100 obtains, on the immediately preceding frame, the motion vector for an area on which it is determined that there is no object, and accumulates an average of the motion vector, and uses it as a means of measuring how far a photographed scene has moved. It is referred to as a cumulative motion vector. If the cumulative motion vector exceeds a predetermined reference value, it is determined that a photographed scene is greatly changed from a scene at a time when the object appearance area was previously inferred. Therefore, the object recognizing apparatus 100 newly infers an object appearance area and initializes the cumulative motion vector to a value of zero. A period for obtaining and accumulating the motion vector may be adjusted according to a computational capability of the computing device.

Figure 5:
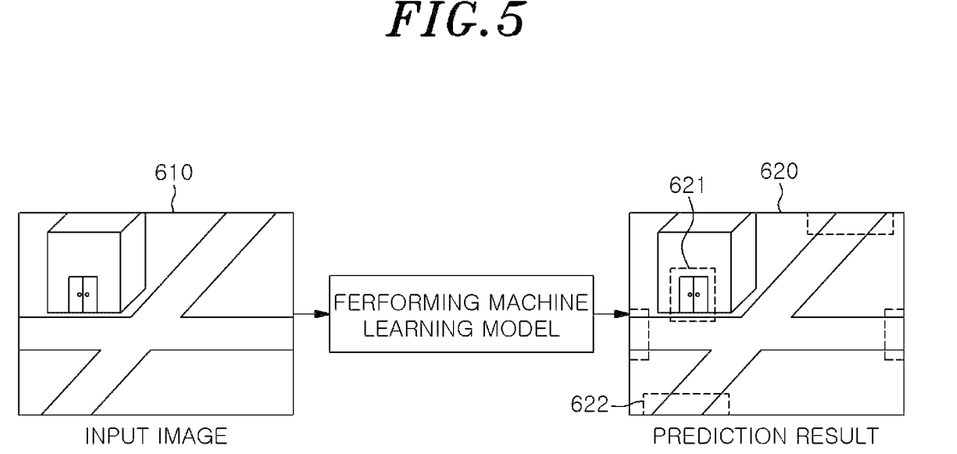
FIG. 5 shows a diagram illustrating an object appearance area predicted through an object recognizing method using a machine learning model according to an embodiment of the present disclosure.

FIG. 5 shows a diagram illustrating an object appearance area predicted through an object recognizing method using a machine learning model according to an embodiment of the present disclosure.

On the other hand, training of a machine learning model will be described. The object recognizing apparatus 100 receives an input of an arbitrary image 610 from a dataset. In addition, the object recognizing apparatus 100 uses a machine learning model to learn a common feature of an area on which an object appears, and infers a candidate area on which a new object will appear when a new image is received as an input. Further, the object recognizing apparatus 100 generates a prediction result image 620 including the candidate area. For example, there are many cases where an object appears at a door 621 of a building or an end of a road 622 which are shown in FIG. 5. As described above, the object recognizing apparatus 100 extracts a common feature of an area where an object appears and uses it as a basis for predicting an area on which an object will appear on a new image.

Also, if an area where the object appears in the dataset is displayed for each pixel, it may be trained to predict it by Superpixel Image Segmentation. Image Segmentation is a task of predicting a type of each pixel of an image. In an embodiment of the present disclosure, it is predicted whether each pixel is classified as an area on which a new object appears or an area on which a new object does not appear. At this time, if all pixels are classified, an amount of calculation will be large. Therefore, the object recognizing apparatus 100 generates a cluster by clustering a plurality of pixels. Each generated cluster is referred to as a Superpixel. The object recognizing apparatus 100 may reduce a computational amount by classifying each Superpixel as the area on which the new object appears or the area on which the new object does not appear. In this case, the number of clustered pixels is not limited to a specific number, and may vary according to image characteristics, or an increase or decrease in the amount of computation.

Figure 6:
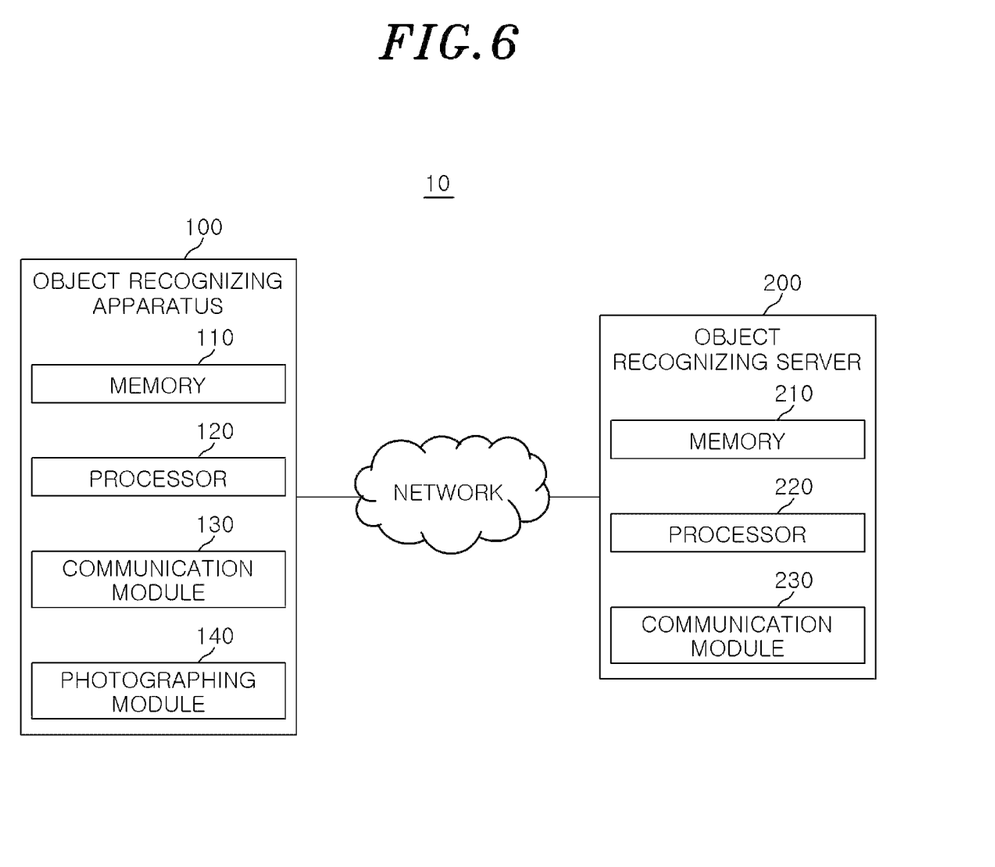
FIG. 6 shows a block diagram illustrating a configuration of an object recognizing system using a machine learning model according to another embodiment of the present disclosure.

FIG. 6 shows a block diagram illustrating a configuration of an object recognizing system 10 using a machine learning model according to another embodiment of the present disclosure.

As shown in FIG. 6, the object recognizing system 10 using the machine learning model according to another embodiment of the present disclosure includes the object recognizing apparatus 100 and an object recognizing server 200. Herein, the object recognizing apparatus 100 includes the memory 110 and the processor 120. Herein, the object recognizing apparatus 100 using the machine learning model may further include the communication module 130 and the photographing module 140. In addition, the object recognizing server 200 includes a memory 210, a processor 220, and a communication module 230. However, the illustrated components of the object recognizing system 10 are not limited thereto. For example, the object recognizing system 10 may be implemented by more components than the illustrated components, or may be implemented by fewer components than the illustrated components.

Hereinafter, a detailed configuration and operation of each component of the object recognizing system 10 using the machine learning model of FIG. 6 will be described.

The communication module 230 obtains a video image or an image used for generating a dataset. Alternatively, the communication module 230 obtains an image captured in an arbitrary environment. In addition, the communication module 230 communicates and interworks with the object recognizing apparatus 100 for object recognition. The communication module 230 may obtain/collect a video image or an image used for object recognition from the object recognizing apparatus 100 or from outside, or may transmit the machine learning model to the object recognizing apparatus 100.

The memory 210 stores the video image or the image obtained through the communication module 230 and used for generation of a dataset. Alternatively, the memory 210 stores an image captured in an arbitrary environment obtained through the communication module 230.

The processor 220 performs object recognition on each frame of the image stored in the memory 210, and obtains types and position information of objects existing on the image for each frame. The processor 220 performs object recognition on each frame of the image, thereby obtaining types and position information of all objects existing on the image for each frame. The processor 220 obtains identification information and position information of an object by performing object tracking by using object information for each frame. In addition, the processor 220 generates a label for distinguishing an area with an object that newly appears on each frame and an area without the object by using the identification information and the position information of the object for each frame. For example, the processor 220 may generate a label for an area on which a specific object newly appears for each frame.

Further, the processor 220 extracts a common feature of an area on which an object appears by using the generated object appearance area dataset, and trains the machine learning model to learn the extracted common feature of the area on which the object appears.

According to embodiments, the processor 220 may infer a candidate area on which a new object will appear, and train the machine learning model to learn the common feature of the inferred candidate area.

According to embodiments, the processor 220 clusters, as a Superpixel, a plurality of pixels of an image in the generated object appearance area dataset, and trains the machine learning model to predict a new object appearance area by Superpixel Image Segmentation that is a unit of the clustered Superpixels.

Figure 7:
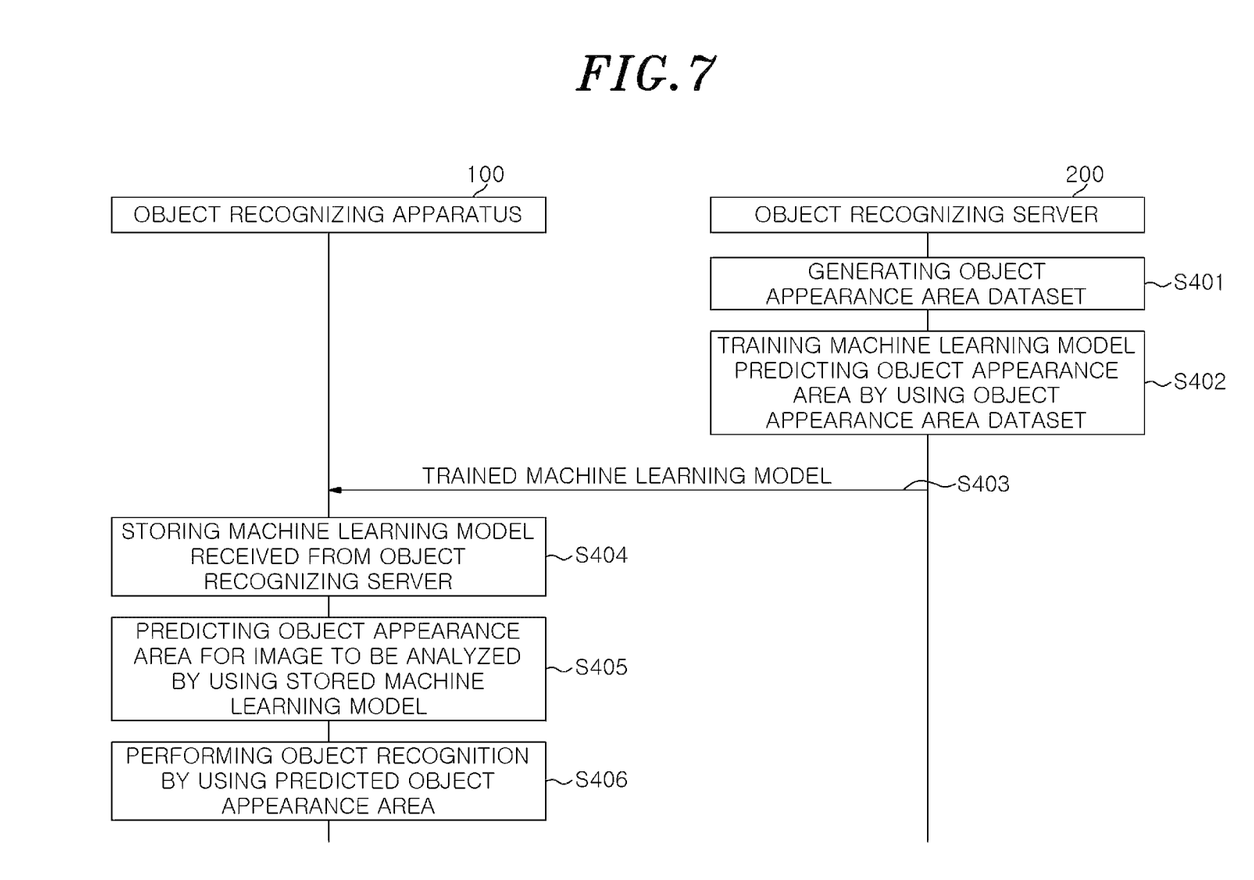
FIG. 7 shows a flowchart illustrating an object recognizing method using a machine learning model according to another embodiment of the present disclosure.

FIG. 7 shows a flowchart illustrating an object recognizing method using a machine learning model according to another embodiment of the present disclosure.

In a step S401, the object recognizing server 200 generates an object appearance area dataset.

In a step S402, the object recognizing server 200 trains a machine learning model that predicts an object appearance area by using the object appearance area dataset.

In a step S403, the object recognizing server 200 transmits the trained machine learning model to the object recognizing apparatus 100. In this case, the object recognizing server 200 stores the trained machine learning model.

On the other hand, in a step S404, the object recognizing apparatus 100 stores the machine learning model received from the object recognizing server 200.

In a step S405, the object recognizing apparatus 100 predicts an object appearance area for an image to be analyzed by using the stored machine learning model.

In a step S406, the object recognizing apparatus 100 performs object recognition by using the predicted object appearance area. In other words, the object recognizing apparatus 100 may infer the object appearance area of a video to be analyzed by using the trained machine learning model, and perform object recognition by using the inferred result.

As described above, according to another embodiment of the present disclosure, the object recognizing server 200 performs operations of generating a dataset and training a machine learning model, and the object recognizing apparatus 100 predicts an object appearance area by using the trained machine learning model, and performs object recognition by using the predicted object appearance area. Another embodiment of the present disclosure may provide a result of object recognition more quickly by performing the operations of generating the dataset and training the machine learning model that use a large amount of computation and storage space in the separate object recognizing server 200.

On the other hand, a non-transitory computer-readable storage medium including at least one program executable by a processor, wherein the computer program includes instructions, when the at least one program is executed by the processor, cause the processor to perform obtaining an image for object recognition, predicting an object appearance area on the obtained image by using a machine learning model that is trained to learn a feature of an area on which an object appears in advance, and recognizing an object on the obtained image by using the predicted object appearance area may be provided.

On the other hand, according to an embodiment of the present disclosure, the various embodiments described above may be implemented as software including instructions stored in a machine-readable storage media. The machine (e.g., a computer) may be a device capable of calling a stored instruction from a storage medium and operating according to the called instruction, and may include an electronic device according to the disclosed embodiments. When the instruction is executed by the processor, the processor may perform a function corresponding to the instruction directly or by using other components under the control of the processor. The instruction may include a code generated or executed by a compiler or an interpreter. The machine-readable storage media may be provided in a form of a non-transitory storage medium. Herein, the 'non-transitory' indicates that the storage medium does not include a signal and is tangible, but does not distinguish that the data is stored in the storage medium semi-permanently or temporarily.

In addition, according to an embodiment of the present disclosure, a method according to various embodiments described above may be provided by being included in a computer program product. The computer program product may be traded between a seller and a buyer as a commodity. The computer program product may be distributed in a form of the machine-readable storage media (e.g., compact disc read only memory (CD-ROM)) or through an application store (e.g., Play Store™) by online. In the case of online distribution, at least part of the computer program product may be temporarily stored or temporarily generated in a storage medium such as a server of a manufacturer, a server of an application store, or a memory of a relay server.

Further, according to an embodiment of the present disclosure, the various embodiments described above may be implemented in a medium that may be read by a computer or a similar device by using software, hardware, or a combination thereof. In some cases, the embodiments described in this application may be implemented by the processor itself. According to software implementation, embodiments such as procedures and functions described in this application may be implemented by separate software modules. Each of the software modules may perform one or more functions and operations described in this application.

On the other hand, computer instructions for performing a processing operation of a device according to the various embodiments described above may be stored in a non-transitory computer-readable medium. When the computer instructions stored in the non-transitory computer-readable medium are executed by the processor of the specific device, the computer instructions cause the specific device to perform processing operations according to the various embodiments described above. The non-transitory computer-readable medium refers to a medium that stores data semi-permanently rather than a medium such as registers, caches, and memory that stores data for a short moment, and may be read by a device. Specific examples of the non-transitory computer-readable media may include CD, DVD, hard disk, Blu-ray disk, USB, memory card, ROM, and the like.

In addition, each of the components (e.g., a module or a program) according to the various embodiments described above may include a singular or plural entity, and a part of the above-described sub-components may be omitted, or another sub-component may be further included in the various embodiments. Alternatively or additionally, a part of components (e.g., the module or the program) may be integrated into a single entity, thereby identically or similarly performing functions performed by each of the components before the integration. The operations performed by the module, the program, or another component according to various embodiments may be executed sequentially, parallel, repetitively, or heuristically, at least a part of operations may be executed in a different order or omitted, or another operation may be added.

What is claimed is:

1. An object recognizing method using a machine learning model performed by an object recognizing apparatus, the method comprising:
    obtaining an image for recognizing an object;
    predicting an object appearance area in the obtained image by using a machine learning model that is trained to learn a common feature of an area in which the object appears in advance; and
    recognizing the object in the predicted object appearance area in the obtained image,
    wherein the object appearance area is defined as an area in which the object actually appears.

2. The method of claim 1, further comprising:
    generating an object appearance area dataset in which a first area in which the object newly appears and a second area in which the object does not newly appear are distinguished for each frame of the image.

3. The method of claim 2, wherein the generating of the object appearance area dataset comprises:
    calculating identification information and position information of the object by performing object recognition for each frame of the image, and then performing object tracking for each frame by using object information; and
    generating the object appearance area dataset storing a label distinguishing an area in which the object newly appears and an area in which the object does not newly appear by using the calculated identification information and the calculated position information of the object for each frame.

4. The method of claim 2, further comprising:
    extracting the common feature of the area in which the object appears by using the generated object appearance area dataset, and
    training the machine learning model to learn the extracted common feature of the area in which the object appears.

5. The method of claim 1, further comprising:
    clustering a plurality of pixels on the image as a Superpixel, and generating a dataset in which the Superpixel is processed by Superpixel Image Segmentation that is a Superpixel unit,
    wherein the machine learning model in a step of predicting the object appearance area predicts the object appearance area by using the dataset.

6. The method of claim 1, further comprising:
recognizing the object in an entire area of a first frame of the image,
wherein, from a second frame of the image, the predicting of the object appearance area and the recognizing of the object are performed.

7. The method of claim 6, wherein the predicting of the object appearance area and the recognizing of the object are re-performed on the second frame in response to a cumulative movement value between an object recognized on the first frame and an object recognized on the second frame being greater than or equal to a threshold value.

8. The method of claim 1, further comprising:
updating the object appearance area by using a cumulative movement value between a current frame and a previous frame in which the object appearance area was predicted in the image.

9. The method of claim 8, wherein the updating of the object appearance area comprises:
updating the object appearance area by using the cumulative movement value in response to the cumulative movement value being smaller than or equal to a predetermined threshold value; and
re-predicting the object appearance area in an image in response to the cumulative movement value being greater than the predetermined threshold value.

10. The method of claim 8, wherein the updating of the object appearance area includes:
calculating a cumulative motion vector by accumulating an average of a motion vector for an area in which the object is not recognized in a previous frame; and
calculating the cumulative movement value between the current frame and the previous frame by using the calculated cumulative motion vector.

11. An object recognizing apparatus using a machine learning model, the apparatus comprising:
a memory configured to store the machine learning model that is trained to learn one or more programs and a feature of an area in which an object appears in advance; and
a processor configured to execute the one or more stored programs,
wherein the processor is configured to:
obtain an image for recognizing the object,
predict an object appearance area in the obtained image by using the machine learning model that is trained in advance to learn a common feature of an area in which the object appears, and
recognize the object in the predicted object appearance area in the obtained image,
wherein the object appearance area is defined as an area in which the object actually appears.

12. The apparatus of claim 11, wherein the processor is configured to generate an object appearance area dataset in which a first area in which the object newly appears and a second area in which the object does not newly appear are distinguished for each frame of the image.

13. The apparatus of claim 12, wherein the processor is configured to:
calculate identification information and position information of the object by performing object recognition for each frame of the image, and then performing object tracking for each frame by using object information; and generate the object appearance area dataset storing a label distinguishing an area in which the object newly appears and an area in which the object does not newly appear by using the calculated identification information and the calculated position information of the object for each frame.

14. The apparatus of claim 12, wherein the processor is configured to:
extract the common feature of the area in which the object appears by using the generated object appearance area dataset, and
train the machine learning model to learn the extracted common feature of the area in which the object appears.

15. The apparatus of claim 12, wherein the processor is configured to:
recognize the object in an entire image of a first frame of the image, and
predict the object appearance area and recognize the object in the object appearance area from a second frame of the image.

16. The apparatus of claim 15, wherein the processor is configured to:
re-predict the object appearance area in the second frame in response to a cumulative movement value between an object recognized on the first frame and an object recognized on the second frame being greater than or equal to a threshold value, and
recognize the object on the re-predicted object appearance area.

17. The apparatus of claim 11, wherein the processor is configured to update the object appearance area by using a cumulative movement value between a current frame and a previous frame on which a previous object appearance area was predicted on an image.

18. The apparatus of claim 17, wherein the processor is configured to;
update the object appearance area by using the cumulative movement value in response to the cumulative movement value being smaller than or equal to a predetermined threshold value, and
re-predict the object appearance area on an image in response to the cumulative movement value being greater than the predetermined threshold value.

19. The apparatus of claim 17, wherein the processor is configured to:
calculate a cumulative motion vector by accumulating an average of a motion vector for an area in which the object is not recognized in the previous frame, and
calculate a cumulative movement value between the previous frame and the current frame by using the calculated cumulative motion vector.

20. A non-transitory computer-readable storage medium including one or more computer programs, wherein the one or more computer programs include instructions, when executed by a processor, cause the processor to perform:
obtaining an image for recognizing an object;
predicting an object appearance area in the obtained image by using a machine learning model that is trained to learn a common feature of an area in which the object appears in advance; and
recognizing the object in the predicted object appearance area in the obtained image,
wherein the object appearance area is defined as an area in which the object actually appears.

* * * * *